United States Patent [19]
Gans et al.

[11] Patent Number: 5,093,725
[45] Date of Patent: Mar. 3, 1992

[54] DYNAMIC SIGNAL MODIFICATION FOR ACHIEVING INTERFERENCE REDUCTION IN CONCURRENTLY TRANSMITTED SIGNALS

[75] Inventors: M. J. Gans, Monmouth Beach; Arun N. Netravali, Westfield, both of N.J.

[73] Assignee: AT&T Bell Laboratories, Murray Hill, N.J.

[21] Appl. No.: 543,617

[22] Filed: Jun. 22, 1990

[51] Int. Cl.$^5$ .......................................... H04N 5/213
[52] U.S. Cl. ...................................... 358/167; 358/142
[58] Field of Search ............... 358/166, 167, 36, 37, 358/146, 142, 31, 12

[56] References Cited

U.S. PATENT DOCUMENTS

| | | | |
|---|---|---|---|
| 4,429,327 | 1/1984 | Oakley | 358/12 |
| 4,538,180 | 8/1985 | Cluniat | 358/167 |
| 4,574,300 | 3/1986 | Hulyer | 358/11 |
| 4,622,578 | 11/1986 | Rzeszewski | 358/12 |
| 4,656,502 | 4/1987 | Hausdorfer et al. | 358/31 |
| 4,661,850 | 4/1987 | Strolle | 358/12 |
| 4,667,225 | 5/1987 | Kanda | 358/167 |
| 4,694,338 | 9/1987 | Tsinberg | 358/141 |
| 4,731,660 | 3/1988 | Faroudja | 358/31 |
| 4,779,133 | 10/1988 | Sugimori | 358/167 |
| 4,825,289 | 4/1989 | Ohta | 358/167 |
| 4,905,084 | 2/1990 | Zucker | 358/141 |
| 4,928,166 | 5/1990 | Akiyama | 358/36 |

FOREIGN PATENT DOCUMENTS 63-63295 3/1988 Japan .

Primary Examiner—John W. Shepperd
Assistant Examiner—Sherrie Hsia
Attorney, Agent, or Firm—Alfred E. Hirsch, Jr.

[57] ABSTRACT

Apparatus for reducing interference in a first signal caused by a second signal. Before the signals are transmitted, the first signal is tested to determine how much interference can be tolerated. During portions of the first signal which can tolerate a large amount of interference, the amplitude of the second signal is increased. During portions of the first signal that can only tolerate a small amount of interference, the amplitude of the second signal is decreased. The average amplitude of the second signal is large enough to provide an acceptable bit error rate or signal to noise ratio, yet small enough not to substantially corrupt the first signal. In one embodiment, the technique is employed to allow transmission of additional data on a television channel.

10 Claims, 2 Drawing Sheets

DYNAMIC SIGNAL MODIFICATION FOR ACHIEVING INTERFERENCE REDUCTION IN CONCURRENTLY TRANSMITTED SIGNALS

TECHNICAL FIELD

This invention relates to data transmission, with specific application to transmission of High Definition Television (HDTV).

BACKGROUND OF THE INVENTION

The bandwidth of a National Television Standards Committee (NTSC) television channel is six megahertz (MHz), and is unlikely to change in the near future. Recently, proposals have been made for High Definition Television (HDTV). An HDTV picture has approximately twice the resolution in both the horizontal and vertical directions as an NTSC television picture. Therefore, in order to transmit the HDTV picture, a larger information bandwidth is required than the 6 MHz provided by the NTSC television channel.

Several systems have been proposed for transmitting the HDTV picture using only the 6 MHz bandwidth provided by the NTSC channel. One such system is described in U.S. Pat. No. 4,905,084, issued to L. Zucker on Feb. 27, 1990. The Zucker patent describes a system whereby two signals are transmitted on the same NTSC television channel by employing two carriers which are polarized orthogonally to each other. The first signal is an NTSC signal, while the second signal is the additional data required to upgrade the NTSC television picture to a higher resolution television picture, although the higher resolution television picture has somewhat less resolution than an HDTV picture.

Other proposals have suggested using two adjacent NTSC channels to transmit the HDTV picture, or using upper and lower sideband modulation on a single channel. While all of these proposals provide a somewhat acceptable picture, it can be appreciated that there is always some interference caused by the additional information being transmitted on the same channel as the NTSC signal. Consequently, the NTSC picture, when received by an NTSC television receiver, appears somewhat degraded from the way it would appear if it were transmitted without any additional information on the channel.

SUMMARY OF THE INVENTION

An improved method and apparatus for reducing interference in a first signal, caused by a second signal being concurrently transmitted, is disclosed. The first signal is monitored to determine how "busy" it is. The transmitted power in the second signal is modified; e.g. increased, during busy portions of the first signal, and decreased during idle portions. Since the first signal can tolerate a large amount of intererence during busy portions, the larger transmitted power in the second signal does not substantially corrupt the first signal. During idle portions, when the first signal would be significantly corrupted by interference from the second signal, the transmitted power of the second signal is appropriately diminished so as not to cause substantial interference with the first signal. In this manner, the average transmitted power in the second signal is great enough to provide acceptable performance, yet small enough not to degrade the first signal being transmitted.

DETAILED DESCRIPTION

Figure 1:
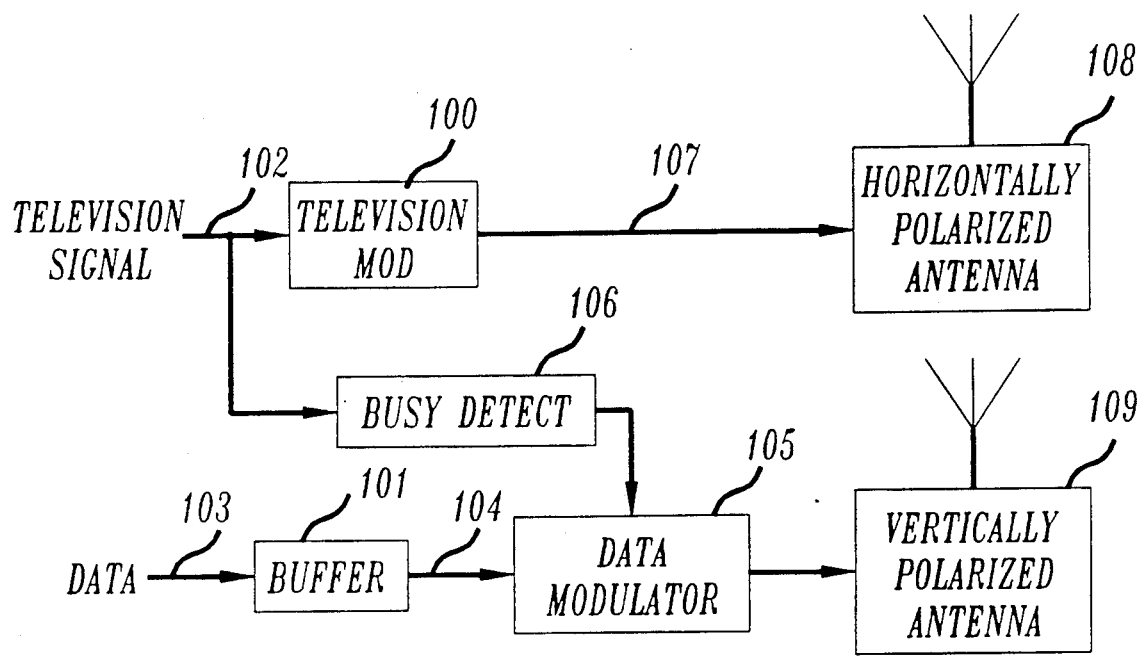
FIG. 1 depicts a block diagram of an exemplary embodiment of the invention, as utilized in a television modulator.

FIG. 1 depicts a block diagram of an exemplary embodiment of the invention as utilized in a television transmission system. The system of FIG. 1 comprises (1) television modulator 100, (2) Busy detect circuit 106, (3) buffer 101 (4) data modulator 105, and (5) antennas 108 and 109. The data on input 103 may be the additional data required to convert an NTSC signal to an HDTV signal, may be an independently encoded HDTV signal, or may be any other additional data to be transmitted on the television channel. In the arrangement of FIG. 1, it can be appreciated that due to atmospheric affects such as scattering, interference will result between signals transmitted from horizontally polarized antenna 108 and signals transmitted from vertically polarized antenna 109.

In operation, a television signal to be modulated arrives on input 102 and is conveyed to television modulator 100. Television modulator 100 outputs a signal onto output 107, which is connected to horizontally polarized antenna 108. From horizontally polarized antenna 108, the signal is radiated into free space for reception by a television receiver.

Concurrently with transmission of the television signal, a data signal arrives at input 103. While the signal on input 103 has been generically termed a data signal, it is to be understood that any signal may be used, such as voice, data, or even another television channel. The data signal on input 103 may be stored temporarily in optional buffer 101 to account for variations in the data arrival rate.

Data from buffer 101 is sequentially read out via output 104 and is used to modulate data modulator 105. The output power of data modulator 105 is adjusted by busy detect circuit 106, described in more detail later herein. The modulated data signal is then transmitted via vertically polarized antenna 109. Since television modulator 100 and data modulator 105 are both arranged to transmit on the same frequency, interference will exist between the modulated television signal and data signal.

Busy detect circuit 106 is arranged to monitor the television signal and to increase the output power during busy portions thereof. Fundamentally, it can be appreciated that there are two conflicting requirements bearing on how to adjust the output power of data modulator 105 in response to busy detect circuit 106. First, in order to provide acceptable performance when receiving the modulated data signal transmitted from data modulator 105, the output power of data modulator 105 should be as large as possible. On the other hand, however, as the output power of data modulator 105 is made larger, more interference with the television signal being transmitted on the horizontal polarization will occur. Therefore, it is desired to strike a balance between these two conflicting requirements. As stated previously, one way to do this is to increase the output power of data modulator 105 during busy portions of the television signal. During these portions, the television signal can tolerate greater interference, since the busyness in the picture will prevent the viewer from seeing substantial interference caused by the modulated data signal.

In a preferred embodiment, the television signal is an NTSC television signal, and the additional data is that required to upgrade to a higher resolution picture, such as an HDTV picture. In this embodiment, a busy portion of the television signal would be a complex pattern on a portion of the screen, such as a close-up of an intricate painting with many different shapes. When this type of picture is being displayed, the human eye cannot detect interference very easily. Consequently, it is acceptable to increase the amplitude of the data signal and allow more interference with the television signal. Conversely an idle portion would be, for example, a large baseball field; i.e. a large area of grass, with little spatial change and only low spatial frequencies. When this type of picture is being displayed, the human eye will detect even slight interference. Thus, when this part of the picture is being transmitted, only low levels of interference can be tolerated and the transmitted power in the data signal must be decreased.

The technique of determining when the television signal can tolerate more interference, as well as the appropriate values of transmitted power, will vary from system to system. However, for an NTSC television picture, acceptable parameters have been determined empirically, and are discussed below.

Figure 2:
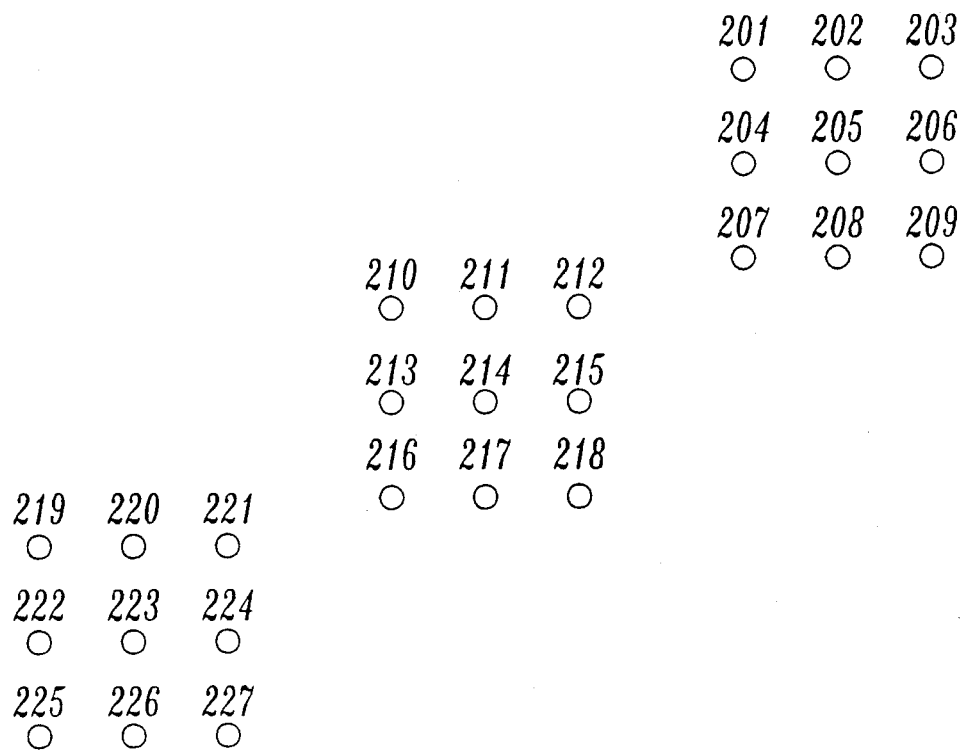
FIG. 2 is a schematic representation of an exemplary nine pixels, with each pixel being represented in three successive time frames.

FIG. 2 represents an exemplary nine pixels, each pixel being represented in three successive time frames of an NTSC television picture. Pixels 201–209 are in the same positions as pixels 210–218 and 219–227, respectively, during three successive frames. Consider the luminance component of an NTSC pixel, say pixel 214 of FIG. 2. Busyness can be viewed as a measure of how different pixel 214 is from its neighboring pixels, both in space and in time. FIG. 2 shows one neighboring pixel previous and subsequent to pixel 214, both in space and in time. Specifically, in the vertical direction, pixels 211 and 217 are prior and subsequent to pixel 214, respectively, while in the horizontal direction, pixels 213 and 215 are prior and subsequent to pixel 214, respectively. In the time dimension, pixels 205 and 223 are prior and subsequent to pixel 214, respectively.

With reference to FIG. 2, the busyness M of pixel 214 can be defined as $$M = \sum_{n=-1}^{+1} \sum_{l=-1}^{+1} \alpha^{l+n}[|d^h_{i-l,j-n}| + |d^v_{i-l,j-n}|] + \beta^{l+n}(|d^t_{i-l,j-n}|) \quad (1)$$

In the above equation, $\alpha$ and $\beta$ are constants, discussed in more detail later herein. $d^h$, $d^v$ and $d^t$ represent the horizontal, vertical, and time components respectively, of the derivative of the luminance portion of the television signal. Therefore, each term in the above double summation represents an approximation of the derivative of the luminance portion of the television signal.

Although the above summations extend between $-1$ and $+1$, it is notable that the summations may extend, in general, between $-p$ and $+p$, where p is any integer. However, in this case a different $\alpha$ and $\beta$ would be associated with each row or column of pixels in the neighborhood of the pixel in question. For example, assume that it is desired to calculate the business of a first pixel. The derivative of a pixel located two rows and two columns from the first pixel would be "weighted" less than a pixel located one row and one column away from the first pixel. In general, the busyness of a pixel is a weighted sum of the derivatives of neighboring pixels with larger weights being given to the derivatives of those pixels located closer to the pixel in question. For example, for each extra row or column of pixels added to the neighborhood, one might reduce the $\alpha$ and $\beta$ by .8. Actual implementation of the busy detect circuit for calculating this summation is described with reference to FIG. 3.

Figure 3:
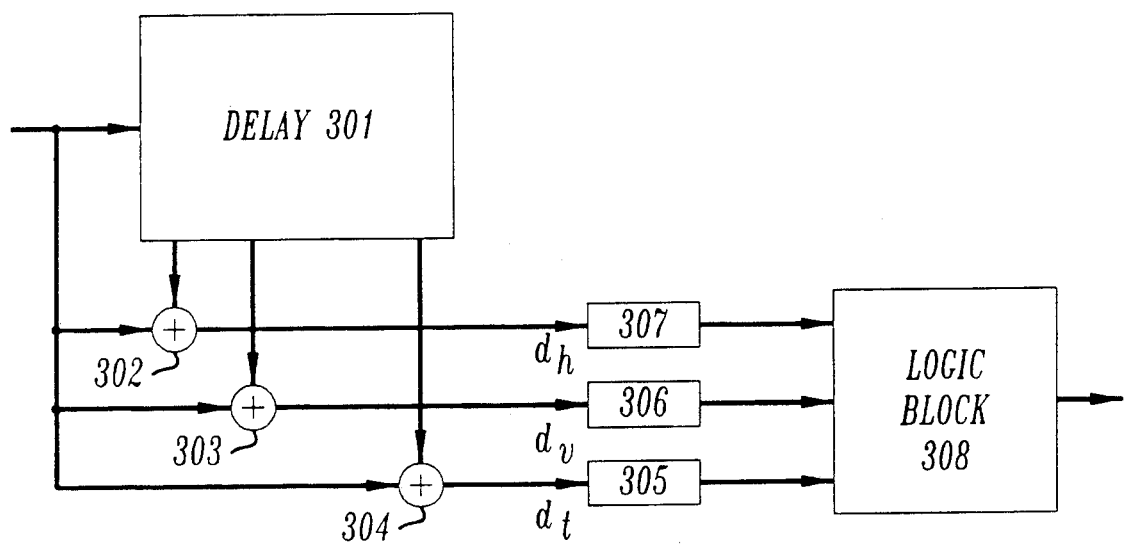
FIG. 3 shows a more detailed block diagram of the busy detect circuit of FIG. 1.

FIG. 3 is a block diagram of an exemplary implementation of busy detect circuit 106 of FIG. 1. The arrangement of FIG. 3 comprises delay elements 301 and 305–307, combiners 302–304, and logic block 308. The connections from each of delay elements 305–307 to logic block 308 is intended to be a bus, although only a single line is shown from each for purposes of clarity.

In operation, the luminance of each pixel is input to delay element 301. Delay element 301 may be, for example, a shift register, capable of holding the luminance of an entire frame of pixels. Each of combiners 302–304 subtracts the luminance of a separate other pixel from the luminance of the current pixel. More specifically, combiner 302 subtracts the luminance of the previous pixel from the same row from the luminance of the current pixel. Combiner 303 subtracts the luminance of the previous pixel in the column from the luminance of the current pixel. Finally, combiner 304 subtracts the luminance of the pixel in the same position of the previous frame from the luminance of present pixel.

From the above, it can be seen that the output of combiners 302–304 is a backward approximation of the first derivative. The outputs of combiners 302–304 represent horizontal, vertical, and time components of the derivative of the luminance signal. While the backwards approximation has been used herein, those in the art will readily realize that forward approximations, trapezoidal rules, or any other derivative approximation technique may be utilized.

Delay elements 305–308 each are large enough to store the luminance derivative associated with two horizontal rows, plus an extra two, of pixels. Logic block 308 will then "tap" the appropriate positions from delay elements 305–307 in order to provide the proper gain control for modulator 106. The details are best understood by way of example, and with reference to FIG. 4.

Figure 4:
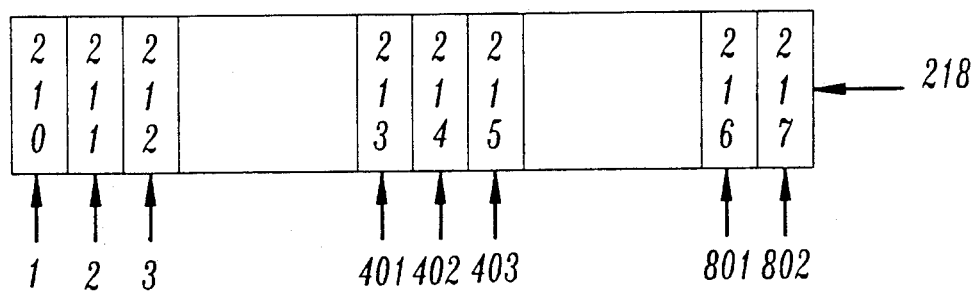
FIG. 4 is an expanded view of a delay element of FIG. 3.

FIG. 4 is an expanded view of delay element 305. Assume delay element 305 is implemented as an 802 symbol shift register; i.e. the derivatives are sequentially shifted in from right to left, and at any time the delay element contains the derivatives of 802 pixels. Assume a particular television picture comprises 525 rows of pixels, and 400 pixels per row. FIG. 2 is a representation of a small portion of such a picture. From Equation 1, it can be seen that the busyness of pixel 214, for example, is a function of the horizontal, vertical, and time derivatives of pixels 210–218. Therefore, when the derivative of pixel 214 is in the 402th position of each delay element, the delay element will contain all information required to calculate the busyness of pixel 214. This is displayed pictorially in FIG. 4, where several positions in delay element 305 are numbered left to right, and the pixels which would be in these positions are also labeled with their corresponding labels from FIG. 2. As can be seen from FIG. 4, the delay elements always contain all the information required to calculate the busyness of whatever pixel is associated with the derivative in position 402. A table lookup can then be utilized to calculate the proper gain to be employed at data modulator 105 of FIG. 1.

One set of values which may be used in the table lookup and has shown excellent results with the 3×3 matrix of pixels discussed above is shown below in Table 1.

| M(ij)  | G(ij) |
|--------|-------|
| 0-10   | 1     |
| 11-30  | 1.5   |
| 31-60  | 2     |
| 61-255 | 3     | where $M_{(ij)}$ is the busyness of the pixel in $i^{th}$ row, $j^{th}$ column, and $G_{(ij)}$ is the relative gain to be applied to that pixel.

The above table assumes that the output amplitude of the data modulator is normalized to some initial minimum value, and that the busyness is normalized to 255. Thus, for each pixel, the busyness is calculated using the above formula, and the initial amplitude of the data modulator is increased by some factor between 1 and 3. Finally, it should be noted from FIG. 2 that to calculate the busyness of pixels which are missing neighboring pixels, such as the leftmost column of pixels in the image, or the uppermost row, the missing pixels may be assumed to have luminance of zero. This can be accomplished via some simplistic control circuitry in busy detect circuit 106.

It is to be understood that the above example is given for illustrative purposes only and represents only one embodiment of the invention. Any method of determining portions of a signal which can tolerate more interference may be used, rather than a business calculation as described above. The two interfering signals need not be on separate polarizations. Rather, the first signal may be any signal which is being interfered with by a second signal. Further, the busy detect circuits may be implemented in parallel, such that the two signals are compared, and the signal which can tolerate the least interference is made larger than the signal which can tolerate the more interference. The amount of interference that a signal can tolerate is, of course, a function of the particular system and the manner in which tolerance is measured.

We claim:

1. Apparatus comprising:
   means for determining an amount of interference, caused by a second signal, which can be tolerated by predetermined portions of a first signal; and
   means responsive to said determining means for modifying the second signal based upon the amount of interference which can be tolerated by each portion of the first signal wherein the first signal is a television signal, the means for determining comprises means for calculating a busyness of the television signal and said means for modifying modifies at least one prescribed characteristic of the second signal.

2. Apparatus comprising:
   means for determining an amount of interference, caused by a second signal, which can be tolerated by predetermined portions of a first signal; and
   means responsive to said determining means for modifying the second signal based upon the amount of interference which can be tolerated by each portion of the first signal wherein the first signal is a television signal, said means for modifying includes means for increasing an amplitude of the second signal and the means for determining comprises means for calculating a busyness of the television signal.

3. Apparatus of claim 1 wherein the busyness M is defined as $$M = \sum_{n=-1}^{+1} \sum_{l=-1}^{+1} \alpha^{l+n}[|d^h_{i-l,j-n}| + |d^v_{i-l,j-n}|] + \beta^{l+n}(|d^t_{i-l,j-n}|)$$

where $\alpha$ and $\beta$ are constants, $d^h$, $d^v$ and $d^t$ represent horizontal, vertical, and time components respectively, of a derivative of a luminance portion of the television signal.

4. Apparatus of claim 2 wherein the busyness M is defined as $$M = \sum_{n=-1}^{+1} \sum_{l=-1}^{+1} \alpha^{l+n}[|d^h_{i-l,j-n}| + |d^v_{i-l,j-n}|] + \beta^{l+n}(|d^t_{i-l,j-n}|)$$

where $\alpha$ and $\beta$ are constants, $d^h$, $d^v$ and $d^t$ represent horizontal, vertical, and time components respectively, of a derivative of a luminance portion of the television signal.

5. Apparatus comprising:
   means for determining an amount of interference, caused by a second signal, which can be tolerated by predetermined portions of a first signal; and
   means responsive to said determining means for modifying the second signal based upon the amount of interference which can be tolerated by each portion of the first signal wherein the first signal is a television signal and the means for determining comprises means for calculating an at least two-dimensional busyness of the television signal.

6. Apparatus comprising:
   means for determining an amount of interference, caused by a second signal, which can be tolerated by predetermined portions of a first signal; and
   means responsive to said determining means for modifying the second signal based upon the amount of interference which can be tolerated by each portion of the first signal wherein the first signal is a television signal and the means for determining comprises means for calculating a busyness of the television signal in at least one spatial dimension and in time.

7. Apparatus of claim 5 wherein the busyness M is defined as $$M = \sum_{n=-1}^{+1} \sum_{l=-1}^{+1} \alpha^{l+n} + \beta^{l+n}(|d^t_{i-l,j-n}|)$$

where $\alpha$ and $\beta$ are constants, $d^h$, $d^v$ and $d^t$ represent horizontal, vertical, and time components respectively, of a derivative of a luminance portion of the television signal.

8. Apparatus of claim 6 wherein the busyness M is defined as $$M = \sum_{n=-1}^{+1} \sum_{l=-1}^{+1} \alpha^{l-n} + \beta^{l-n} ( d^t_{i-l,j-n} )$$

where $\alpha$ and $\beta$ are constants, $d^h$, $d^v$ and $d^t$ represent horizontal, vertical, and time components respectively, of a derivative of a luminance portion of the television signal.

9. Apparatus of claims 1, 2, 3, 4, 5, 6, 7, or 8 wherein said first signal and said second signal are polarized in different directions from each other.

10. Apparatus of claim 9 wherein said first signal and said second signal are polarized in different directions from each other.

* * * * *